Feb. 22, 1944.  C. M. ANDERSON  2,342,507

VARIABLE SPEED REVERSING MECHANISM

Filed June 17, 1941  2 Sheets-Sheet 1

C. M. ANDERSON
INVENTOR.

BY Lester B. Clark
ATTORNEY.

C. M. ANDERSON
INVENTOR.

BY Lester B. Clarke
ATTORNEY

Patented Feb. 22, 1944

2,342,507

UNITED STATES PATENT OFFICE 2,342,507

VARIABLE SPEED REVERSING MECHANISM

Carl M. Anderson, Corsicana, Tex., assignor to American Well & Prospecting Company, Corsicana, Tex., a corporation Application June 17, 1941, Serial No. 398,466

1 Claim. (Cl. 74—189.5)

This invention relates to power transmission mechanisms and is of particular utility in hoisting mechanisms serving the functions of mechanisms of this type which are well known in well drilling operations.

It is the primary object of the invention to simplify drawworks transmissions without the loss of any of the essential operating characteristics of such equipment.

Another object is to provide a device of the class described having extreme flexibility in speeds and driving ratios in both direct and reverse driving.

Still another object is to provide power transmission apparatus including a hydraulic torque converter and mechanisms for driving an output shaft therefrom in either forward or reverse direction at variable speeds and at variably controlled driving ratios relative to the input speed from a prime mover to the converter.

Another and more specific object of the invention is to provide a device of the class described wherein the output of a torque converter continuously drives a countershaft and a clutch element, a drive shaft being mounted coaxially with the output shaft of the converter and provided with a shiftable clutch element having peripheral teeth engageable with complementary teeth on each the first mentioned clutch element and a gear mounted on the countershaft so that the drive shaft is operable at widely variable speeds and at variable driving ratios relative to the rate of rotation of the input shaft of the torque converter.

The foregoing are primary objects and will, together with other objects, be more fully apparent from the following description of one embodiment of the invention shown in the accompanying drawings and in which.

Figure 3:
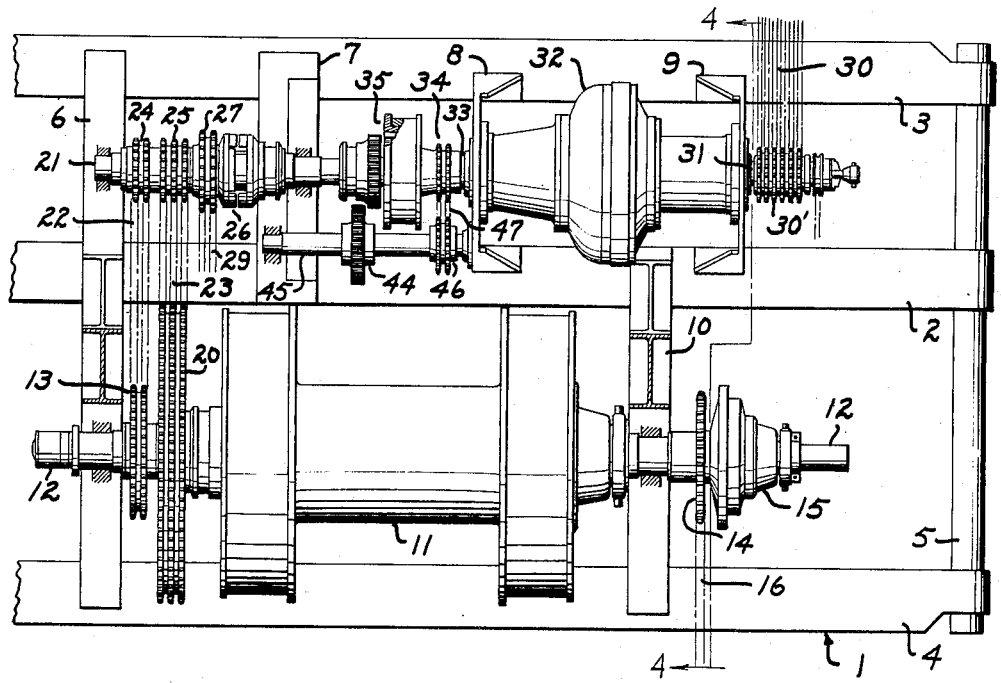
Fig. 3 is a plan view showing the complete assembly embodying the invention in a drawworks.
Figure 4:
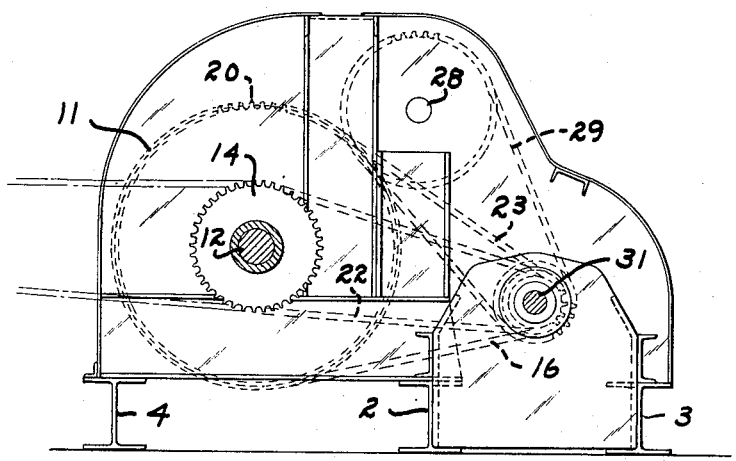
Fig. 4 is an end elevation of the construction shown in Fig. 3, the view being taken on line 4—4 in Fig. 3.

Referring first to Fig. 3 of the drawings, the invention comprehends a variable speed reversing mechanism comprising a base 1 made up of skids 2, 3 and 4 secured together by end members 5 and surmounted by transverse support members 6 to 10 inclusive. The reeling drum 11 is rotatably mounted upon shaft 12 supported in pillars upon the support members 6 and 10. Sprockets 13 are mounted upon shaft 12 so that such shaft may be drivably connected to sprocket 14 through the clutch 15 to drive chain 16 whereby power is transmitted to well drilling equipment such for example as the rotary table (not shown).

Sprockets 20 are secured to the drum 11 and the sprockets 13 and 20 are drivably connected to a drive shaft 21 as by means of drive chains 22 and 23 which respectively connect sprockets 24 and 25 on the drive shaft 21 with sprockets 13 and 20 on the shaft 12 and the drum 11.

A jaw clutch 26 is provided on the drive shaft 21 to connect sprocket 27 to a jack shaft 28 through a drive chain 29 so that such jack shaft may be driven at a controlled rate for carrying out other phases of well drilling operations.

An important phase of the invention resides in the construction for driving the shaft 21 and its associated assembly at desired rates of rotation and in a desired direction. It is important that an efficient and flexible connection be provided between a suitable prime mover (not shown) and the shaft 21. This construction is shown as comprising a driving connection such as drive chains 30 (Fig. 3) between the prime mover and the input pulley or sprocket 30' on the input shaft 31 of a hydraulic torque converter 32 which is mounted upon support members 8 and 9 and having an output shaft 33 which, as is known, is driven at controllable speeds and ratios relative to the rate of rotation of the input shaft 31. The hydraulic torque converter 32 is provided with control means which is shown as a hand wheel 32' which, as is known, controls the slip or passage of hydraulic fluid within the converter between the driving and driven elements.

Figure 1:
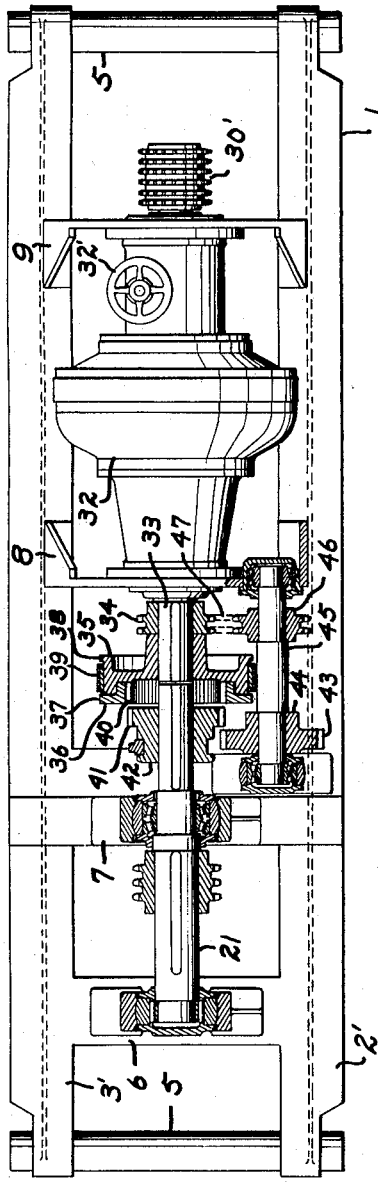
Fig. 1 is a plan view partly in section showing one form of the invention.

As best seen in Fig. 1 the outer end of the output shaft 33 has keyed thereto a sprocket 34 and a flanged clutch member 35 which has a ring 36 secured to its outer face, such ring having a radially extending portion 37 which cooperates with the periphery of the clutch member 35 and a radial extension 38 thereon to form an annular groove to receive the brake band 39 by means of which the rotation of the output shaft 33 and elements keyed thereto may be braked.

The internal periphery of the ring 36 is provided with teeth 40 which are complementary to the teeth 41 on a second clutch element 42 and also with the teeth 43 on a gear 44 fixed to a countershaft 45 which is driven by sprocket 46 also fixed upon the countershaft 45 and in alignment with the sprocket 34 to receive drive chain 47 whereby the countershaft 45 is constantly rotated with and in the same direction as the direction of rotation of the output shaft 33.

Figure 2:
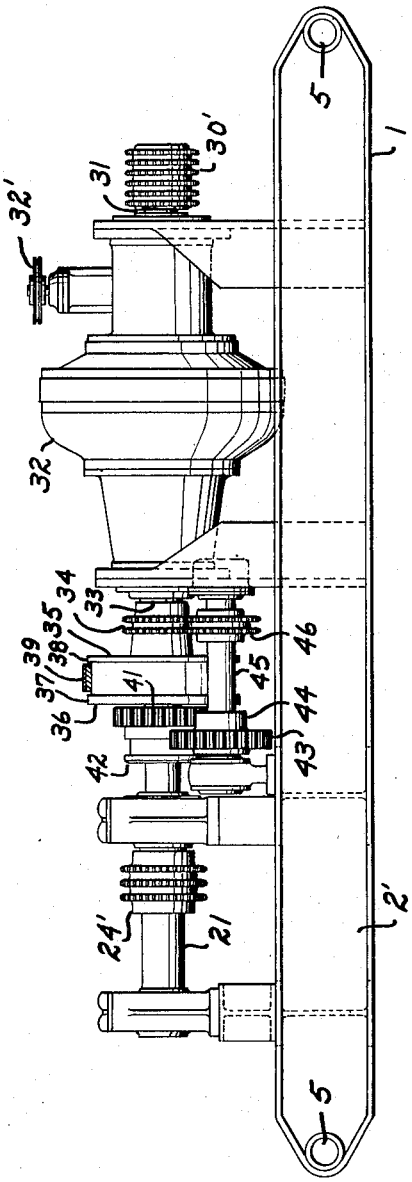
Fig. 2 is a side elevational view of the structure shown in Fig. 1.

In Figs. 1 and 2 the hydraulic torque converter and the associated gear mechanism just described, together with the drive shaft 21 are shown as mounted upon separate skids identified as 2' and 3'. This assembly may be mounted upon a unitary base 1 as shown in Fig. 3 or may be separated therefrom as shown in Figs. 1 and 2 so that the drawworks may be broken into separate units to facilitate transportation thereof. The embodiment of this phase of the construction is the same as that shown in Fig. 3 except that but a single drive sprocket 24' is shown upon the drive shaft 21, it being understood however, that any suitable number of driving elements, such as sprockets or pulleys may be mounted upon this drive shaft.

The operation of the device of the invention seems apparent from the foregoing description. By way of summary it will be pointed out that power supplied from the prime mover through the driving connection 30 to the input sprocket or pulley 30' is imparted to the input shaft 31 of the hydraulic torque converter 32 and thence to the output shaft 33 at a ratio which is determined by the operator through the adjustment of the control wheel 32'. If it be assumed that the converter 32 is adjusted for a ratio of unity, then the output shaft 33 and the countershaft 45 will be driven at the same rate of speed as the input shaft 31 assuming that the sprockets 34 and 46 are of the same diameter.

The drive shaft 21 may therefore be driven at a unity ratio with the shaft 31 by shifting the clutch element 42 to the right or left, it being understood that if this clutch element is shifted to the right it will engage the internal teeth in the clutch element 35 and there will hence be a direct drive at unity ratio between the shaft 31 and the shaft 21.

If, however, the clutch element 42 is shifted to the left, the engagement with the clutch member 35 will be released and thereafter the teeth 41 and the clutch element 42 will engage the teeth 43 on the gear 44 whereby the drive shaft 21 will be driven in reverse at unitary ratio relative to the rotation of the drive shaft 31.

The above explanation assumes that the driving ratio of the torque converter 32 is unity. It is to be understood, however, that this driving ratio may be readily altered by varying the setting of the hand wheel 32' and that such adjustment of the hand wheel will cause a smooth but constant change in the driving ratio between the input and output shafts. It seems apparent that the construction above described provides an efficient transmission of power between the prime mover and the driving sprockets 24, 25 and 27 shown in Fig. 3, or the single sprocket 24' in Figs. 1 and 2 which sprockets are connected to the shaft 21. It also seems apparent that equipment driven by the mechanisms herein described is driven at readily controlled rates of speed either direct or in reverse and at readily controllable ratios between the driving and driven elements.

Broadly the invention comprehends the provision of a novel power transmission mechanism which provides smooth application of power to the various mechanisms in a drawworks together with a smooth and accurate control of the driving ratio between the prime mover and the driven elements.

What is claimed is:

A power transmission comprising a hydraulic torque converter having an output shaft, a drive shaft coaxial with the output shaft, a counter shaft disposed laterally of said shafts, sprockets on said output and counter shafts, a chain thereover to normally rotate said counter shaft, an annular clutch member having a peripheral braking surface thereon fixed on said output shaft, a brake band surrounding said annular clutch member for selective engagement therewith to stop the output shaft, internal gear teeth in said clutch member, a clutch pinion slidable on said drive shaft, a set of external teeth thereon to engage said internal teeth of said clutch member, an external gear fixed on said counter shaft and spaced axially of said clutch member and having teeth thereon to also receive the external teeth of said clutch pinion, and means to shift said clutch pinion into engagement with the teeth of said clutch member for direct drive or into engagement with the teeth of said external gear for reverse drive.

CARL M. ANDERSON.